(12) United States Patent
Li et al.

(10) Patent No.: US 7,890,496 B2
(45) Date of Patent: *Feb. 15, 2011

(54) QUERY ROUTING OF FEDERATED INFORMATION SYSTEMS FOR FAST RESPONSE TIME, LOAD BALANCE, AVAILABILITY, AND RELIABILITY

(75) Inventors: Wen-Syan Li, Fremont, CA (US); Inderpal S. Narang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/100,651

(22) Filed: Apr. 10, 2008

(65) Prior Publication Data

US 2008/0189243 A1 Aug. 7, 2008

Related U.S. Application Data

(63) Continuation of application No. 11/214,082, filed on Aug. 29, 2005.

(51) Int. Cl.
*G06F 7/00* (2006.01)
(52) U.S. Cl. ...................... 707/713; 707/719
(58) Field of Classification Search ................. 707/713, 707/718, 719, 720
See application file for complete search history.

(56) References Cited

U.S. PATENT DOCUMENTS

| | | | | |
|---|---|---|---|---|
| 5,412,806 A | * | 5/1995 | Du et al. ............................. | 1/1 |
| 5,873,083 A | | 2/1999 | Jones et al. | |
| 5,913,206 A | * | 6/1999 | Chaudhuri et al. .................. | 1/1 |
| 5,913,207 A | * | 6/1999 | Chaudhuri et al. .................. | 1/1 |
| 5,926,813 A | * | 7/1999 | Chaudhuri et al. .................. | 1/1 |
| 5,950,186 A | | 9/1999 | Chaudhuri et al. | |
| 5,960,423 A | * | 9/1999 | Chaudhuri et al. .......... | 707/715 |
| 6,169,983 B1 | * | 1/2001 | Chaudhuri et al. .................. | 1/1 |
| 6,567,802 B1 | | 5/2003 | Popa et al. | |
| 6,615,203 B1 | | 9/2003 | Lin et al. | |
| 7,139,778 B2 | * | 11/2006 | Chaudhuri et al. .......... | 707/717 |

(Continued)

OTHER PUBLICATIONS

Wen-Syan Li, et al., "QoS-based Data Access and Placement for Federal Systems," Proceedings of the 31st VLDB Conference Trondheim, 2005.

(Continued)

*Primary Examiner*—Hung T Vy
(74) *Attorney, Agent, or Firm*—Gibb I.P. Law Firm, LLC

(57) ABSTRACT

Disclosed are embodiments of a system for optimizing query processing in a federated information system. The system may be used to identify alternative query plans in a simulated environment and to calculate cost estimates associated with the alternative query plans, based not only on database statistics and query statements, but also based on workload and processing latencies associated with specific data source and with the federated information system as a whole. In addition the calculated cost estimates may also factor in data source availability and reliability. The system may use the alternative query plans and the associated cost estimates to influence query processing in a federated information system by feeding to the federated information system query plans that allow for cost-efficient query plan-level load distribution, cost-efficient query fragment plan-level load distribution, and load distribution based upon quality of service cost constraints.

20 Claims, 10 Drawing Sheets

U.S. PATENT DOCUMENTS

| | | | |
|---|---|---|---|
| 7,233,939 B1 * | 6/2007 | Ziauddin | 707/718 |
| 7,233,944 B2 * | 6/2007 | Ahmed | 1/1 |
| 7,383,247 B2 * | 6/2008 | Li et al. | 1/1 |
| 2004/0002957 A1 | 1/2004 | Chaudhuri et al. | |
| 2004/0003004 A1 | 1/2004 | Chaudhuri et al. | |
| 2006/0026133 A1 * | 2/2006 | Ahmed | 707/3 |
| 2006/0047721 A1 | 3/2006 | Narang et al. | |

OTHER PUBLICATIONS

Vanja Josifovski, et al., "Garlic: A New Flavor of Federated Query Processing for DB2," ACM SIGMOD, Jun. 4-6, 2002.

* cited by examiner

| query | 1st est. Q cost | actual Q cost | 2nd Q cost |
|---|---|---|---|
| Q1 | 15 | | 18 |
| Q2 | 14 | 18 | 17.74 |
| Q3 | 17 | | 21.54 |
| Q4 | 15 | 20 | 20 |

Q Cost Calibration Factor:
1.26 = (18 + 20) / (15 + 15)

QUERY ROUTING OF FEDERATED INFORMATION SYSTEMS FOR FAST RESPONSE TIME, LOAD BALANCE, AVAILABILITY, AND RELIABILITY

CROSS-REFERENCE TO RELATED APPLICATIONS

This application is a continuation of U.S. application Ser. No. 11/214,082 filed Aug. 29, 2005, the complete disclosure of which, in its entirety, is herein incorporated by reference.

BACKGROUND OF THE INVENTION

1. Field of the Invention

The invention generally relates to query routing in federated information systems, and, more particularly, to query routing in federated information systems designed to optimize response time and load balance while considering remote source availability and remote source reliability.

2. Description of the Related Art

Federated query optimizers often deploy cost-based query optimization mechanisms. Specifically, these optimizers can determine multiple global query execution plans and, then, select the execution plan with the lowest execution cost. Thus, cost functions indirectly influence what remote sources are accessed to retrieve data and how federated queries are processed. However, in many federated information systems, the cost function is based on database statistics and query statements without consideration of remote system availability and remote system reliability. Such systems also do not consider the dynamics of the runtime and workload environments. Furthermore, the approach of selecting the global query execution plan with the lowest cost and applying this plan to all similar queries is not necessarily ideal. For example, such an approach does not allow workloads to be distributed among alternative servers to achieve better load balance. Therefore, there is a need for a method, a computer program and a system for query routing in federated information systems that are each designed to optimize response time and load balance while also considering remote source availability and remote source reliability.

SUMMARY OF THE INVENTION

In view of the foregoing, embodiments of the invention provide a system for optimizing query processing in a federated information system. The system may be used to identify alternative query plans and to calculate cost estimates associated with the alternative query plans, based not only on database statistics and query statements but also based on workload and processing latencies associated with specific data source and with the federated information system as a whole. In addition the calculated cost estimates may also factor in data source availability and reliability. The system may use the alternative query plans and the associated cost estimates to influence query processing in a federated information system by feeding to the federated information system query plans that allow for cost-efficient query plan-level load distribution, cost-efficient query fragment plan-level load distribution, and load distribution based upon quality of service cost requirements.

More particularly, an embodiment of the system comprises a simulated federated information system (i.e., a simulator) and a query cost calibrator (i.e., a calibrator) for optimizing query processing in a federated information system. The calibrator and the simulator can be located on the same or different machines than the information integrator of the actual federated information system.

The calibrator is in communication with the actual federated information system and is adapted to intercept queries received by the actual federated information system and to pass these queries on to the simulator. The simulator is adapted to derive alternative query plans for each of these queries. Each query plan includes a plurality of query fragment plans and each query fragment plan is associated with a specific data source within the federated information system. The simulator is further adapted to determine cost estimates for each query plan (i.e., first query cost estimates) and separate cost estimates for each query fragment contained within each query plan (i.e., first query fragment cost estimates). The first query fragment cost estimates are generally based on database statistics and the query statements (e.g., the size of the expected results from the query statements). The first cost query cost estimates are determined using a cost model, which includes the first query fragment cost estimates and additional costs associated with merging and aggregating the results.

The calibrator is also adapted to calibrate source-specific cost factors (i.e., query fragment processing cost calibration factors) for each data source in the federated information system based on information provided by either the federated information. Specifically, each source-specific cost factor is calibrated based on at least one of processing latency associated with a corresponding data source and workload associated with the corresponding data source. To calibrate a source-specific cost factor for a specific data source the calibrator divides an actual query fragment cost (i.e., a query fragment runtime cost that is determined by the actual federated information system when the specific data source processes a query fragment) by a first query fragment cost estimate for processing that query fragment. A first query fragment cost estimate and an actual query fragment cost for processing a query fragment plan can be recorded as a result of a previously received query request processed by the actual federated information system. Alternatively, if no query fragments have been previously processed by the specific data source, then agents (i.e., daemon programs) may be used by the simulator to issue an initial query fragment to the specific data source in the actual federated information system so that an actual query fragment cost for processing the initial query fragments can be recorded and so that a first query fragment cost estimate and the actual query fragment cost can then be processed by the calibrator to determine the source-specific cost factor for that specific data source.

Once the source-specific cost factors are calibrated, the simulator can calculate second query fragment cost estimates for processing each of the query fragment plans by multiplying each of the first cost estimates times a corresponding one of the source-specific cost factors. Thus, the second query fragment cost estimates factor in data source processing latency and workload.

Additional cost estimates can also be calculated by the simulator based on data source availability and reliability. For example, the system may also use agents (e.g., daemon programs) that periodically access and determine the availability of specific data sources within the federated information system. Cost estimates of any of the data sources that are determined to be unavailable can be temporarily set at infinity by the simulator until such time as the data source is again determined to be available. Similarly, the calibrator can also be adapted to monitor and record errors associated with each of the data sources in the federated information system when executing query fragments and to calculate for each of the data sources a percentage of query fragment processing that results in the errors. This percentage can be divided by a predetermined acceptable percentage so as to determine a reliability cost factor (i.e., reliability cost calibration factors) for each of the data sources. Then, reliability-sensitive query fragment cost estimates (i.e., third cost estimates) can be determined for processing each of the query fragments by the simulator by multiplying the reliability cost factors for each of the data sources times the second query fragment cost estimates corresponding to each of the data sources. Thus, the third cost estimates factor in data source reliability as well as processing latency and workload.

Additionally, the simulator can be adapted to re-estimate the cost of each of the query plans based on overall system workload. Specifically, as mentioned above, the simulator can determine a first query cost estimate. The calibrator can calibrate a system cost factor based on at least one of processing latency and workload associated within the federated information system (e.g., within the information integrator of the federated information system) by dividing a sum of actual recorded query costs associated with processing a plurality of different queries in the federated information system by a sum of corresponding first query cost estimates. Then, the simulator can calculate second query cost estimates for each of the query plans by multiplying each of the first query cost estimates times the system cost factor.

Once the above described query and query fragment cost estimates are determined, the simulator can be used to balance workload distribution either on a query plan-level or query fragment plan-level by influencing query plan selection within the federated information system.

Specifically, the simulator can be adapted to balance load distribution on a query fragment plan-level by first determining which query plan has the lowest second query cost estimate (i.e., query cost estimate based on system workload) and analyzing that plan. For example, the simulator can determine the workloads associated with each of the query fragment plans within that query plan and compare those workloads to predetermined thresholds. Specifically, the workload for a specific query fragment plan can be determined by multiplying the query fragment cost estimate, such as either a second query cost estimate (based on data source workload and latency) or third cost estimate (based on data source workload, latency, and reliability) times the frequency at which the query is requested in a given period. Then, if the calibrator determines that the workload associated with the specific query fragment is above the predetermined threshold, the simulator can balance workload distribution for that query fragment. This can be accomplished by identifying other query fragment plans that are both identical to the specific query fragment plan and have cost estimates (i.e., second or third cost estimates) close to the specific query fragment plan (e.g., within twenty percent). Then, each time the query is requested, the simulator can submit the one query plan with the lowest query cost estimate to the federated information system. However, each time this one query plan is submitted, the specific query fragment plan and the other identical query fragment plans are interchanged in an alternating manner (e.g., in a rotating manner) so as to distribute the query fragment workload across different data sources within the federated information system.

The simulator can also be adapted to balance load distribution on a query plan-level. This is accomplished by determining which one of the query plans has the lowest query cost estimate (e.g., the lowest first query cost estimate or the lowest second query cost estimate based on system workload) and analyzing that query plan. If that lowest query cost estimate is above a predetermined threshold value, the simulator can instead of selecting just the lowest plan, select a plurality of query plans from amongst the alternative plans to be submitted to the federated information system in an alternating manner. The number of query plans selected can be limited in a cost-efficient manner by first clustering the query plans into groups such that each query plan in a given group has query fragments associated with the same set of data sources and then selecting only those query plans having the lowest query cost estimates from each of the groups. The number of query plans can be further limited by determining which one of those selected query plans has the lowest cost estimate and which of the other query plans having query cost estimates that are near that lowest cost estimate (e.g., those query plans having a second query cost estimate within twenty percent of the lowest second query cost estimate). Then, each time the query is requested, the simulator can submit to the federated information system any one of the selected plurality of query plans in an alternating manner (e.g., in a rotating manner) so as to distribute the query workload across different data sources within the federated information system.

Alternatively, balancing of load distribution can be accomplished by the simulator at the query plan-level based on quality of service requirements. For example, the simulator can again cluster the query plans into groups with each group having query fragment plans that are associated with the same set of data sources. For each group, the query plan with the lowest query cost estimate (e.g., the lowest first or second query cost estimate) is selected for consideration. Then, each time the query is requested, one query plan is selected from amongst the remaining low cost plans. The one plan that is selected is that query plan that has a query cost estimate that is closest to without being greater than a predetermined cost requirement (i.e., a quality of service constraint for cost).

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which:

FIG. 7 is a schematic block diagram illustrating another exemplary operational process for the system of FIG. 2;

DETAILED DESCRIPTION OF EMBODIMENTS OF THE INVENTION

Figure 1:
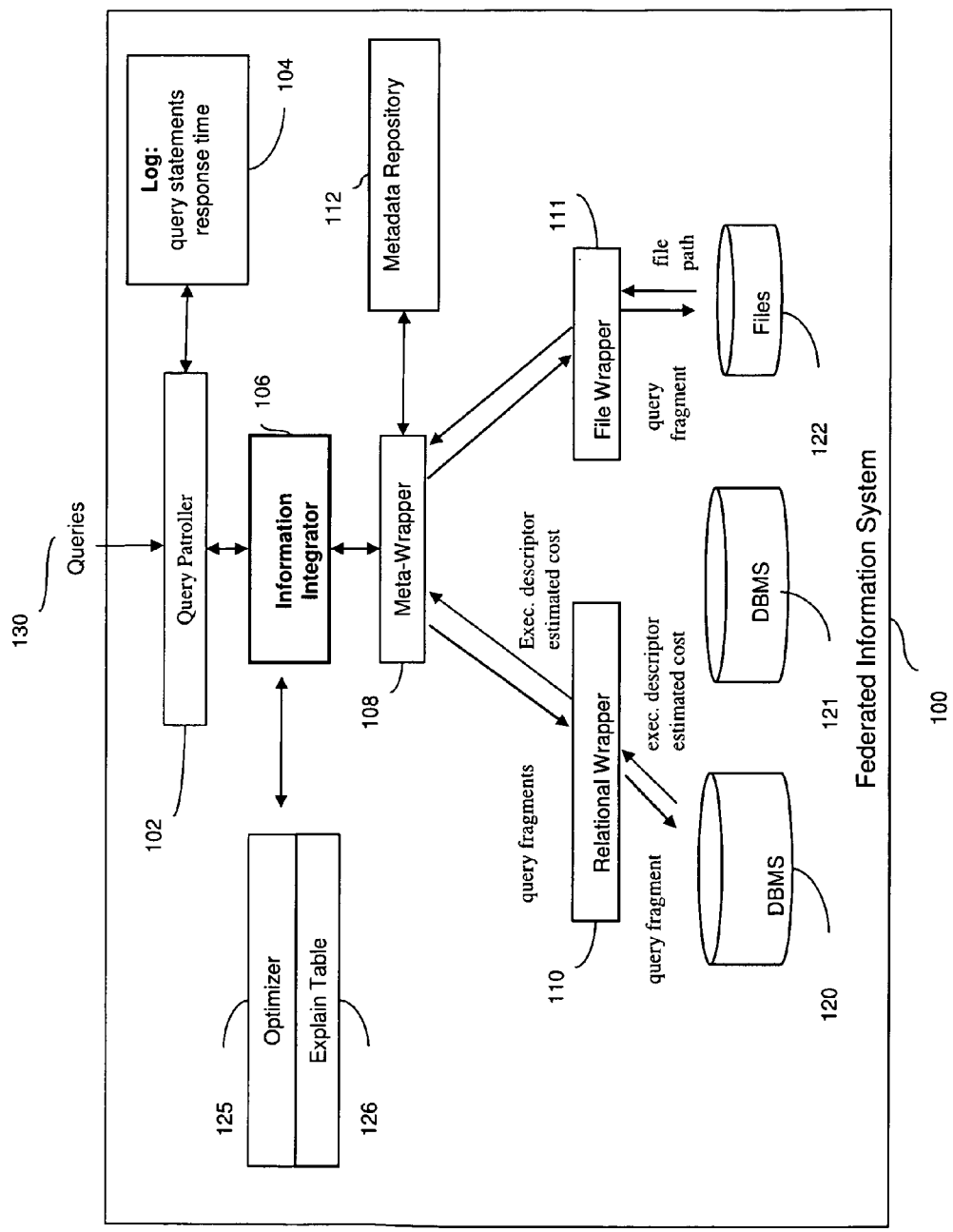
FIG. 1 is a schematic block diagram illustrating a federated information system.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

A wide variety of applications require access to multiple heterogeneous distributed data sources 120-122 within federated information systems, such as the exemplary federated information system 100 illustrated in the architectural overview of FIG. 1. By transparently integrating such diverse data sources 120-122, the underlying differences in database management system's (DBMS), languages, and data models can be hidden and users can use a single data model and a single high-level query language to access the unified data through a global schema. To address the needs of such federated information systems 100, database information integrators 106 and meta-wrappers 108 have been incorporated into federated information systems 100 to provide relational access to both relational DBMSs 120-121 and to unstructured data sources, such as file systems 122, web services, and other applications. Specifically, relational wrappers 120-121 allow for accessing data in relational database management systems (DBMSs). While file wrappers 122, on the other hand, are required for accessing file systems or spreadsheets.

Generally, in such systems 100 data sources 120-122 are registered to the information integrator 106 using nicknames that are stored in a data repository 112. The meta-wrapper 108 serves as middleware between the information integrator 106 and the wrappers 110-111 that provide access to the remote sources 120-122 and/or replicas (e.g., as illustrated in U.S. patent application Ser. No. 10/931,002, Narang et al., filed Aug. 31, 2004, and incorporated herein by reference). For example, the meta-wrapper 108 can be a wrapper that encapsulates all data sources 120-122 and replicas for a logical domain, and makes them appear to the information integrator 106 as a single source. The meta-wrapper's 108 primary role can be late binding of data sources to the logical domain. Application programs can access data by specifying only the domain. During optimization, the query information integrator 108/query optimizer 125 can push down to the meta-wrapper 108 query fragments that involve a logical domain. The meta-wrapper 108 can then contacts an external metadata repository 112, such as that described in Narang et al., with the logical domain and the query predicates and the query's quality of service (QOS) constraints (e.g., a constraint on the query's tolerance for stale data), in order to determine the set of sources/replicas (e.g., 120-122) that have relevant information for this query 130. The meta-wrapper 108 then sends the query fragment from the information integrator 106/optimizer 125 (after schema translation) to the wrappers 120-122 for the actual data sources/replicas, and gets a query fragment plan over each of them. The meta-wrapper 108 then generates multiple composite query plans by combining the query fragment plans returned from the data sources/replicas and the optimizer 125 selects the lowest cost plan. At runtime, the meta-wrapper 108 can behave like a union operator that merges the tuples from each of the source wrappers 110-111. The meta-wrapper can also substitutes sources with replicas (or vice-versa) upon failures.

The operational processes of such a federated information system 100 can be separated into two phases, the "compile time phase" and the "runtime phase". During the "compile time phase", a user query 130 submitted to the information integrator 106 is intercepted by the query patroller 102 which records the query statement and the query submission time in a log 104. The query 120 is then forwarded to the information integrator 106 for further processing. For example, the information integrator 106 accesses the data repository 112 (e.g., via the meta-wrapper 108) to retrieve the nickname definitions for the user query and breaks (i.e. rewrites) the query into multiple sub-queries (i.e., query fragments). The meta-wrapper 108 receives the query and particularly, the query fragments, from the information integrator 108 and records the following information: (a) the incoming federated query statement, (b) the estimated cost of the federated query, (c) the outgoing query fragments, and (d) their mappings to the data sources. The query fragments are forwarded to the appropriate wrappers 110-111 according to their types. For the sub-queries forwarded to the relational wrapper 110, the wrapper 110 will return the query fragments that can be executed at each remote server 120 or 121 (i.e., data source) and the estimated costs for each of these query fragments. For the sub-queries forwarded to the file wrapper 111, the file paths are typically returned to information integrator 108 without an estimated cost. Note that the wrappers 110, 111 have an option of asking the remote data sources 120-121 for possible supported execution plans and their estimated costs.

During the "runtime phase" after the information integrator 108 receives all query fragments that can be executed at the remote data sources 120-122 as well as their estimated costs, a query optimizer 125 (e.g., an optimizer 125 that is integral with or separate from the information integrator 106) performs global optimization and the query is processed accordingly. The meta-wrapper 108 records the response time (i.e., the actual query fragment cost) for processing each query fragment. The global query plan, with its estimated cost, including the individual query fragment plans, with their estimated costs, is stored in the explain table 126. Additionally, other information needed for executing queries at the remote data sources (e.g., the remote execution descriptors for the selected query fragments) are also stored in the explain table 126. Then, the query fragments that are contained in the global query plan are sent to their corresponding remote data sources 120-122 for execution. The query fragments are executed at the data sources a 120-122 and the results are returned to the information integrator 108 through the wrappers 110-111 and meta-wrapper 108. The results are merged by the information integrator 106 and are then sent back to the user that made the query 130 request. After the query execution is completed, the query patroller 102 records the query completion time in the log 104 for future use.

The federated information system 100, as illustrated in FIG. 1 and described above, and specifically, the information integrator 106 in conjunction with the query optimizer 125, deploys cost-based query optimization to select a low cost global query plan to execute. Thus, the cost functions used by the information integrator/optimizer 106/125 heavily influence the selection of which remote servers 120-122 will be accessed and how federated queries 130 are processed. Cost estimation is typically based on database statistics, query statements, and the local system configuration (including the CPU power and I/O device characteristics such as seek time and transmission rates). In addition, federated information system 100, as described above, allows the system administrator to specify expected network latencies between information integrator and the remote servers; however, current cost functions do not consider the loads of the remote resources 120-122, the dynamic nature of local and remote conditions, and/or the availability and reliability characteristics of the remote sources 120-122. As a result, federated query processing within federated information system, such as system 100, does not dynamically adapt to runtime environment changes, such as network congestions or load spikes at the remote sources. Nor do such systems 100 avoid unreliable sources when alternatives are available. Furthermore, the query optimizer 125 optimizes user queries 130 individually rather treating a workload as a whole. Thus, in some scenarios, selecting a low cost global query plan and applying this plan to all similar queries is not necessarily ideal because the workload may need to be distributed among alternative servers for better overall system performance via load balance.

In view of the foregoing, embodiments of the invention provide an improved federated information system for optimizing query processing. The system may be used to identify alternative query plans and to calculate cost estimates associated with the alternative query plans, based not only on database statistics and query statements but also based on workload and processing latencies associated with specific data source and with the federated information system as a whole. In addition the calculated cost estimates may also factor in data source availability and reliability. The system may use the alternative query plans and the associated cost estimates to influence query processing in a federated information system by feeding to the federated information system query plans that allow for cost-efficient query plan-level load distribution, cost-efficient query fragment plan-level load distribution, and load distribution based upon quality of service cost requirements.

Figure 2:
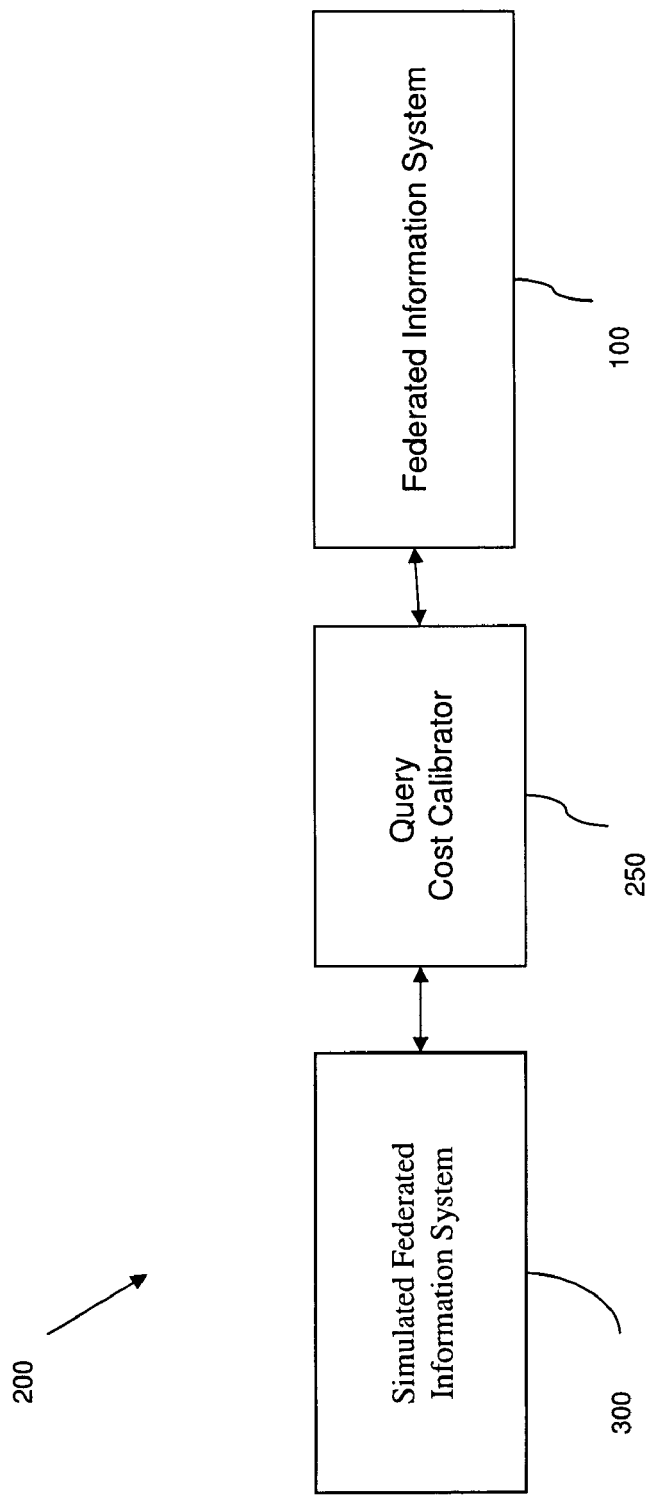
FIG. 2 is a schematic block diagram illustrating an embodiment the system of the invention.

Referring to FIG. 2, an embodiment of the invention is a system for optimizing query processing in a federated information system 100 as described above. The system comprises a query cost calibrator 250 (QCC) (i.e., a calibrator) adapted to intercept queries from a federated information system 100 (as illustrated in FIG. 1 and described above) and a simulator 300 (i.e., a simulation of the federated information system 100) adapted to analyze those queries and feed to the federated information system 100 a query processing plan that is the best fit based on workload at either a query plan or query fragment plan-level. Specifically, the simulator 300 in conjunction with the QCC 250 derives alternative query plans and performs "what-if" analyses for query routing and data placement. As explained above, in the federated information system 100, as illustrated in FIG. 1, after a query compile-time phase is completed, only the global query plan with the lowest cost (i.e., the lowest first query cost estimate based on the cost model described above) is stored in the explain table. When a query is unique this approach of simply choosing the lowest cost plan is suitable. However, if there are a large number of similar queries that use the same global query execution plan, then the remote servers (i.e., data sources) involved in this plan can get overloaded, rendering the original statistics invalid. To prevent such hot-spots and achieve proper load distribution, this simulator 300, based on the cost estimates (e.g., the second query cost estimates and/or the second query fragment cost estimates), submits alternative cost-efficient plans to the federated information system 100 so as to distribute the workload within the federated information system on either a global query plan-level or a query fragment plan-level.

Figure 3:
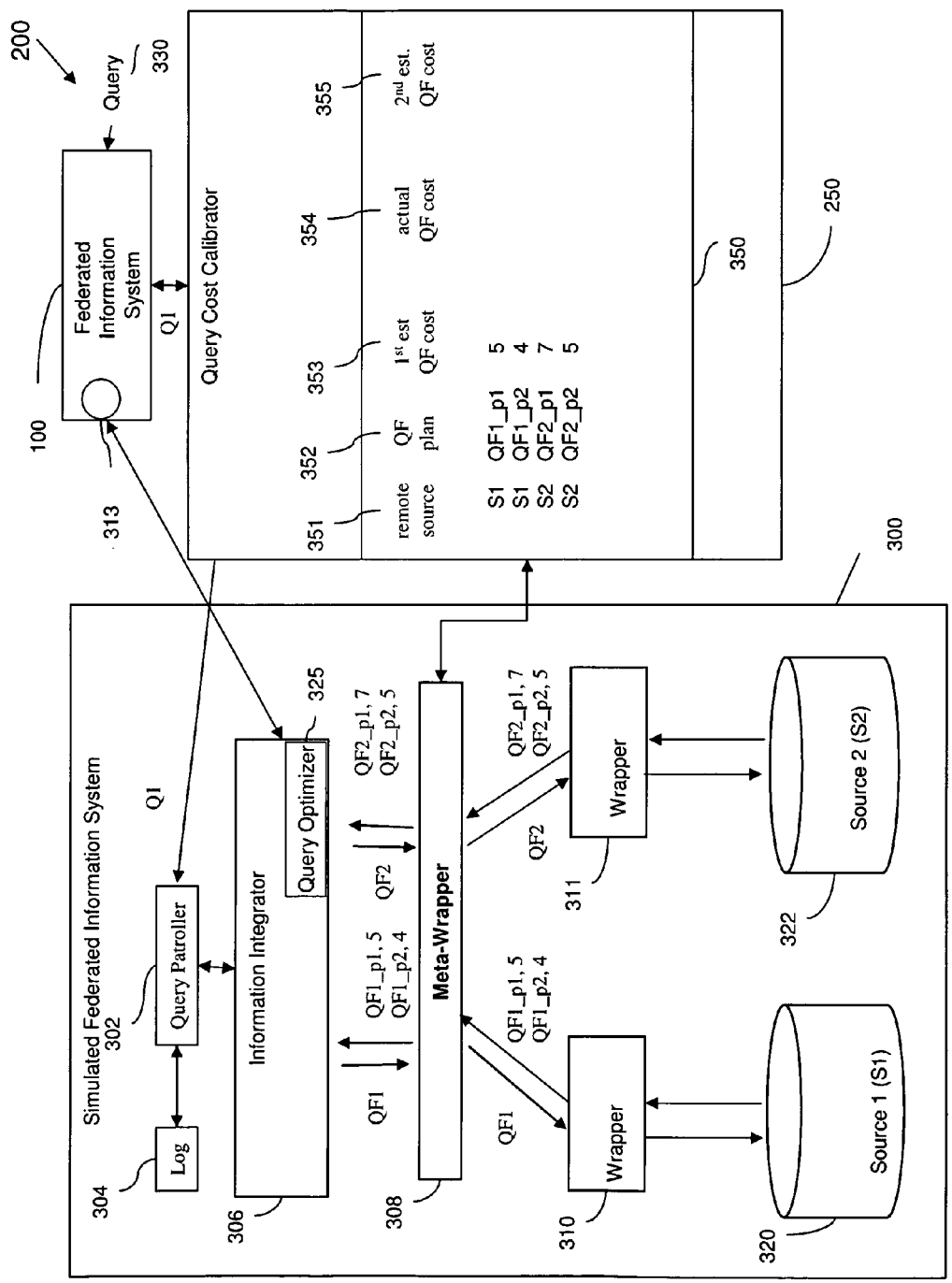
FIG. 3 is a schematic block diagram illustrating an exemplary operational process for the system of FIG. 2.

More particularly, both the calibrator 250 and the simulator 300 may be located on the same or different machines than the information integrator 106 of the federated information system 100. Referring to FIG. 3, the simulator 300 is a simulation of the federated information system 100 and comprises one or more of the same functional features of the federated information system 100. For example, the simulator 300 can comprise a simulated query patroller 302, a simulated information integrator 306, a simulated optimizer 325, a simulated meta-wrapper 308, simulated wrappers 310-311, simulated data sources 320-322, etc. As mentioned above, the calibrator 250 is adapted to intercept queries 330 (e.g., query Q1) and pass them to the simulator 300 and, more particularly, to the simulated query patroller 302 which functions as it would in the actual federated information system 100. For example, the simulated query patroller 302 can record the query statement and the query submission time in a log 304.

The simulator 300 is adapted to derive alternative query plans for a query 330 submitted to the federated information system 100. Each query plan includes a plurality of query fragment (QF) plans and each query fragment plan is associated with a specific data source 320, 322 which are simulations of data sources 120, 122, respectively, of system 100. The simulator 300 is further adapted to determine first query cost estimates for each query plan (i.e., a total cost estimate for processing each query plan) and first query fragment cost estimates for each query fragment contained within each query plan (i.e., a cost estimate for processing each individual query fragment). The first query fragment cost estimates are generally based on database statistics and query statements. The first cost query cost estimates are determined using a cost model, which includes the first query fragment cost estimates and additional costs associated of merging and aggregating the results.

The calibrator 250 (i.e., the Query Cost Calibrator (QCC)) is in communication with the simulator 300 and is adapted to record these costs. For example, as illustrated in FIG. 3 the memory 350 of the calibrator 250 records each query fragment (QF) plan 352, the remote source 351 associated with each QF plan 352, and the first cost estimate 353 for each QF plan 352 following the compile-time phase. The calibrator 250 is further adapted to calibrate source-specific cost factors (i.e., query fragment processing cost calibration factors) for each data source in the federated information system 100. Each source-specific cost factor is calibrated based on at least one of processing latency associated with a corresponding data source and workload associated with the corresponding data source.

Figure 4:
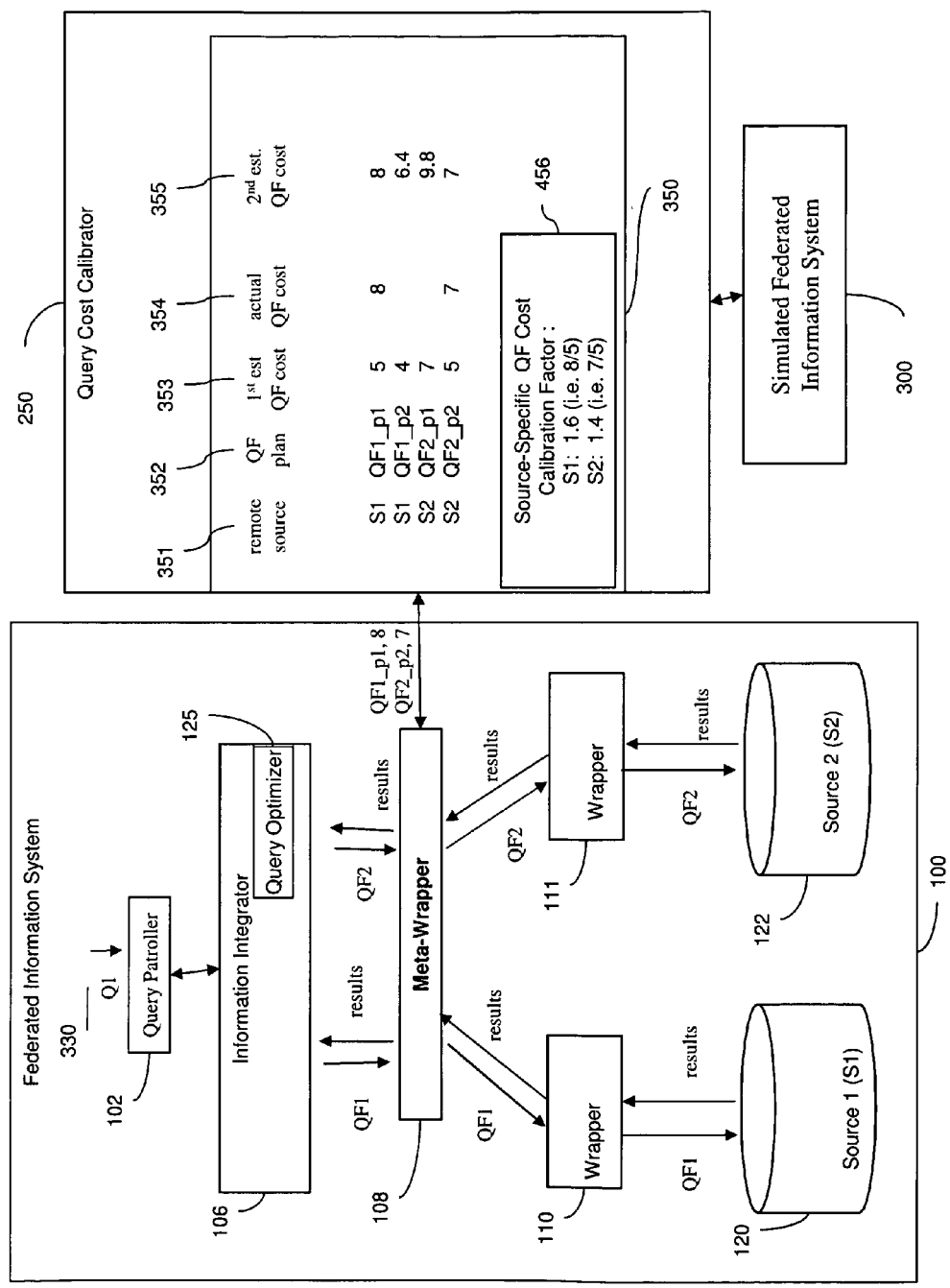
FIG. 4 is a schematic block diagram illustrating an exemplary operational process for the system in FIG. 2.

Specifically, referring to FIGS. 3 and 4 in combination, each source-specific cost factor 456 is calibrated based on at least one of processing latency associated with a corresponding data source and workload associated with the corresponding data source. To calibrate a source-specific cost factor for a specific data source 320-322 the calibrator 250 divides an actual query fragment cost 354 (i.e., a query fragment runtime cost that is determined by the actual federated information system 100 when the specific data source processes a query fragment) by a first query fragment cost estimate 353 for processing that query fragment plan. A first query fragment cost estimate and an actual query fragment cost for processing a query fragment plan can be recorded in the memory 350 of the calibrator 250 as a result of a previously received query request processed by the federated information system 100.

Alternatively, if no query fragments have been previously processed by the specific data source within the federated information system 100 (e.g., S1 120 or S2 122), then agents 313 (i.e., daemon programs) may be used by the simulator 300 to access the federated information system 100 and to issue an initial query fragment to be executed by those specific data sources (e.g., S1 120 or S2 122). By issuing such an initial query fragment plan to the federated information system 100 via agents 313, an actual query fragment cost 354 for processing a query fragment by the specific data source (e.g., S1 120) can be recorded and thus, a first query fragment cost estimate 353 and the actual query fragment cost 355 can be processed by the calibrator 250 to determine the source-specific cost factor 456 for that specific data source. For example, for database management system-based remote sources, the daemon programs 313 can issue a series of pre-defined queries on system tables, while the daemon programs 313 fetch a set of pre-placed files of various sizes for file system-based remote sources.

Once the source-specific cost factors 456 are calibrated, the simulator 300 can calculate second query fragment cost estimates 355 for processing each of the query fragment plans 352 and store those second query fragment cost estimates 355 in the calibrator 250 memory 350. The second QF cost estimates 355 can be calculated by multiplying each of the first cost estimates 353 times a corresponding one of the source-specific cost factors 456. Thus, the second query fragment cost estimates 355 factor in data source processing latency and workload For example, a federated query Q1 330 that requires a joining of data from two data sources is received by the federated information system 100 and intercepted by the calibrator 300. The simulated information integrator 306 accesses the simulated individual data sources 320 and 322 with query fragments and merges the results locally. During the compile time, Q1 is transformed into two query fragments, QF1 and QF2, for S1 320 and S2 322 (corresponding to S1 120 and S2 122 of system 100), respectively, and both query fragments are forwarded to the simulated meta-wrapper (MW) 308. The simulated MW 308 forwards QF1 and QF2 to the corresponding simulated wrappers 310, 311 for an initial cost estimation (i.e., a first QF cost estimate). The simulated wrappers 310, 311 compute and return to the simulated MW 308 possible execution plans 352 for these query fragments along with their first QF cost estimates 353 which are recorded in memory 350 by the calibrator 250. For example, two QF plans 352 (QF1$_{13}$ p1 and QFL_p2) and their associated first QF costs estimates 353 (e.g., 5 and 4) can be returned for QF1 and two QF plans 352 (QF2_p1 and QF2_p2) and their associated costs 353 (e.g., 7 and 5) can be returned for QF2. In addition to forwarding this information to the simulated information integrator 306, the simulated MW 308 passes the query fragment plans 352 and their associated first QF cost estimates 353 (e.g., QF1_p1-5, QFL_p2-4, QF2_p1-7 and QF2_p2-5) to the QCC 250 which records in them in memory 350 along with the identify of the corresponding data source 351.

During the actual run-time phase in the federated information system 100, as illustrated in FIG. 4, the query optimizer 125 of the federated information system 100 selects a query plan, e.g., QF1_p1 and QF2_p2, using query fragment information returned by its MW 108. At this point, neither the simulated MW 308 of the simulator 300 nor the QCC 250 knows which query fragment plans 352 have been selected by the query optimizer 125. After the selection of the query execution plan by the query optimizer 125, the run time phase of the query processing starts. At the run time, the selected query fragment plans 352, one for each query fragment QF1 and QF2 (e.g., QF1_p1 and QF2_p2) are sent to the MW 108, which then forwards the corresponding execution descriptors to the appropriate data sources (e.g., remote servers 120 and 122) through the wrappers 110-111. After the execution of the query fragments QF1 and QF2 are completed, the MW 108 passes the results back to the information integrator 106 which provides the results to the user that requested the query 130. Additionally, the MW 108 keeps track of the response times (i.e., the actual query fragment costs 354) of the individual query fragments (e.g., QF1_p1 has an actual cost of 8 and QF2_p2 has a run time of 7, respectively) and passes this information to QCC 250 which stores it in memory 350 for future use.

At this point, QCC 250 has recorded the first estimated QF costs 353 and the actual QF costs 354 for two different query fragments plans 352 processed by two different remote sources 351 (e.g., remote sources S1 (120) and S2 (122)). Assuming that the original cost estimates (i.e., the first query fragment cost estimates 353) are valid, any significant difference between these two sets of values has to be caused by variations in the network latencies or processing cost variations at the remote sources due to their local workloads. These external and dynamic factors are not explicitly known to the information integrator 106; however, their combined effects can be captured by the query cost calibrator 250 and used to re-estimate the cost of query fragments such that workload is factored into the query fragment cost estimates. Specifically, for each data source (e.g., 120 and 122), if a first estimated query fragment cost 353 and an actual query fragment cost 354 (i.e., a runtime statistic) are available, then a source-specific cost calibration factor 456 can be calibrated (e.g., by calibrating the ratio of the average runtime cost vs. the average estimated cost). This allows the simulated information integrator 306 and, particularly, the simulated query optimizer 325, to consider network and process latencies at the data sources without having to observe these factors explicitly. Once time source-specific query cost calibration factors 456 are calculated, they can be stored in memory 350 and used for calibrating estimated costs (i.e., second QF cost estimates) based on data source workload for future, yet-unseen query fragments (e.g., query fragment plans 352 such as QFL_p2-4 and QF2_p1-7).

Thus, referring to FIG. 4, the source-specific cost calibration factors 456 for sources S1 120 and S2 122 of system 100 can be calculated. For example, the query fragment plan QF1_p1 has an actual QF cost of 8 and an estimated QF cost of 5 so the source-specific cost calibration factor for source S1 120 is equal to 1.6 (i.e., 8/5). Similarly, the query fragment plan QF2_p2 has an actual QF cost of 7 and an estimated QF cost of 5 so the source-specific cost calibration factor for source S2 120 is equal to 1.4 (i.e., 7/5). Using the source-specific cost calibration factors, second estimated query fragment costs 355 can be calculated by the calibrator 250 for the same or different query fragments on the same source which have no runtime cost records. For example, the query fragment plan QF1_p2 from a previously seen query Q1 has a first QF cost estimate of 4 and no actual QF cost. The second QF cost estimate for this query fragment plan is 6.4 (i.e., 4 times the source-specific cost factor of 1.6).

Figure 5:
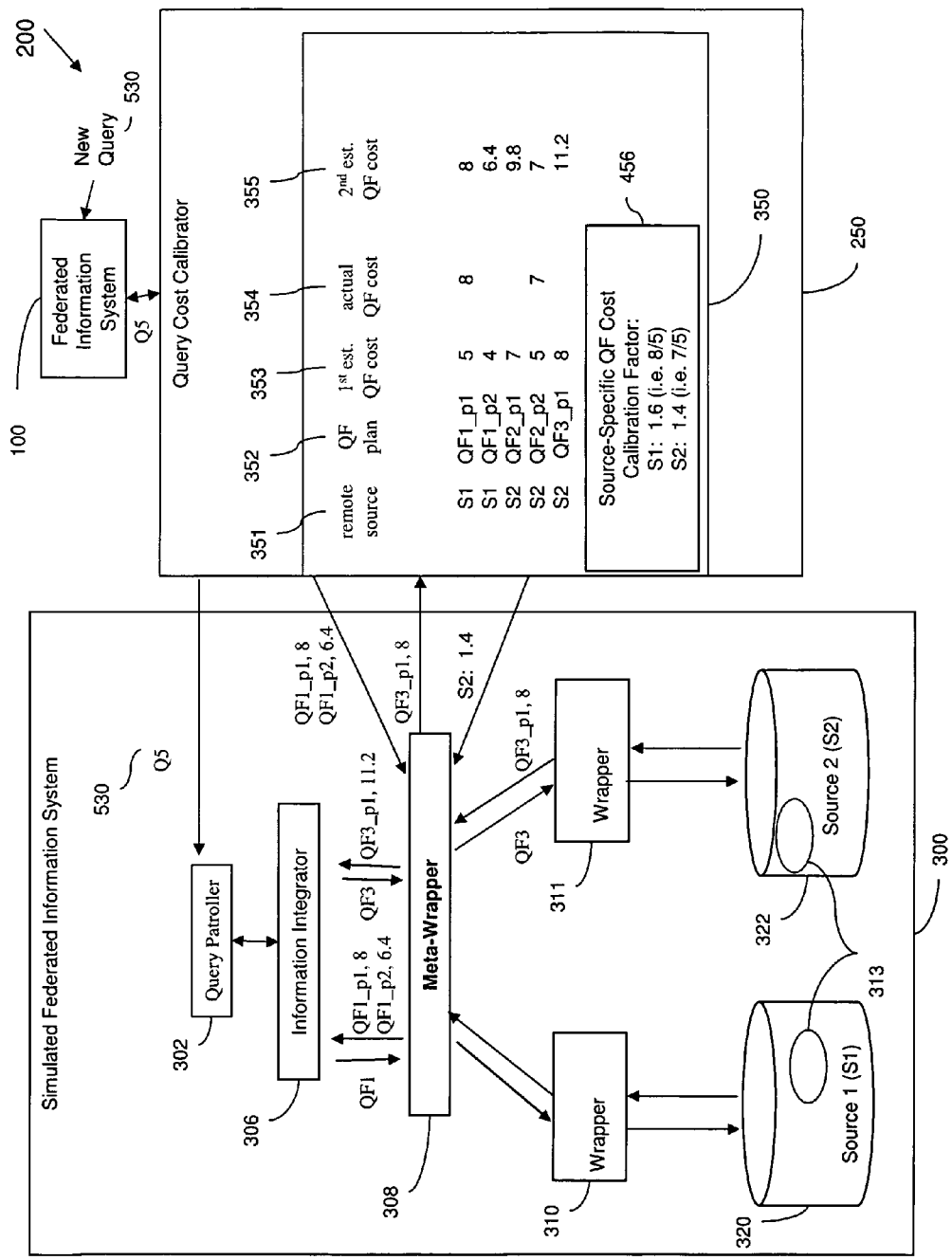
FIG. 5 is a schematic block diagram illustrating another exemplary operational process for the system of FIG. 2.

Similarly, referring to FIG. 5, a new federated query, Q5, can be issued to the system 100, and this query can be intercepted by the QCC 250 and passed to the simulator 300 where it is divided into two query fragments: query fragment QF1 that was previously seen and query fragment QF3 that was not been previously seen. Then, during the compile time phase in the simulator 300, for the query fragment QF3 the simulated MW 308 consults the simulated wrapper 311 to get a query fragment plan 352, QF3_p1, and its estimated cost 8. However, instead of returning just the first QF cost estimate 353 for the QF plan QF3_p1, the simulated MW 308 re-estimates the QF cost to 11.2 (i.e., the second QF cost estimate for query fragment plan QF3_p1) by multiplying the first QF cost estimate of 8 by the source-specific cost calibration factor of 1.4. On the other hand, since there is already a query fragment plan 352 and an estimated cost for QF1, the simulated MW 308 can compute the second QF cost estimate 355 (i.e., the calibrated runtime cost) for the both the QF plan QF1_p1, which is equal to 8 (i.e., the actual runtime 354), and QF2_p1, which is equal to 6.4 (i.e., the first QF cost estimate 4 times the source-specific cost-calibration factor 456 for remote source S1 of 1.6) without having to consult the wrapper.

Figure 6:
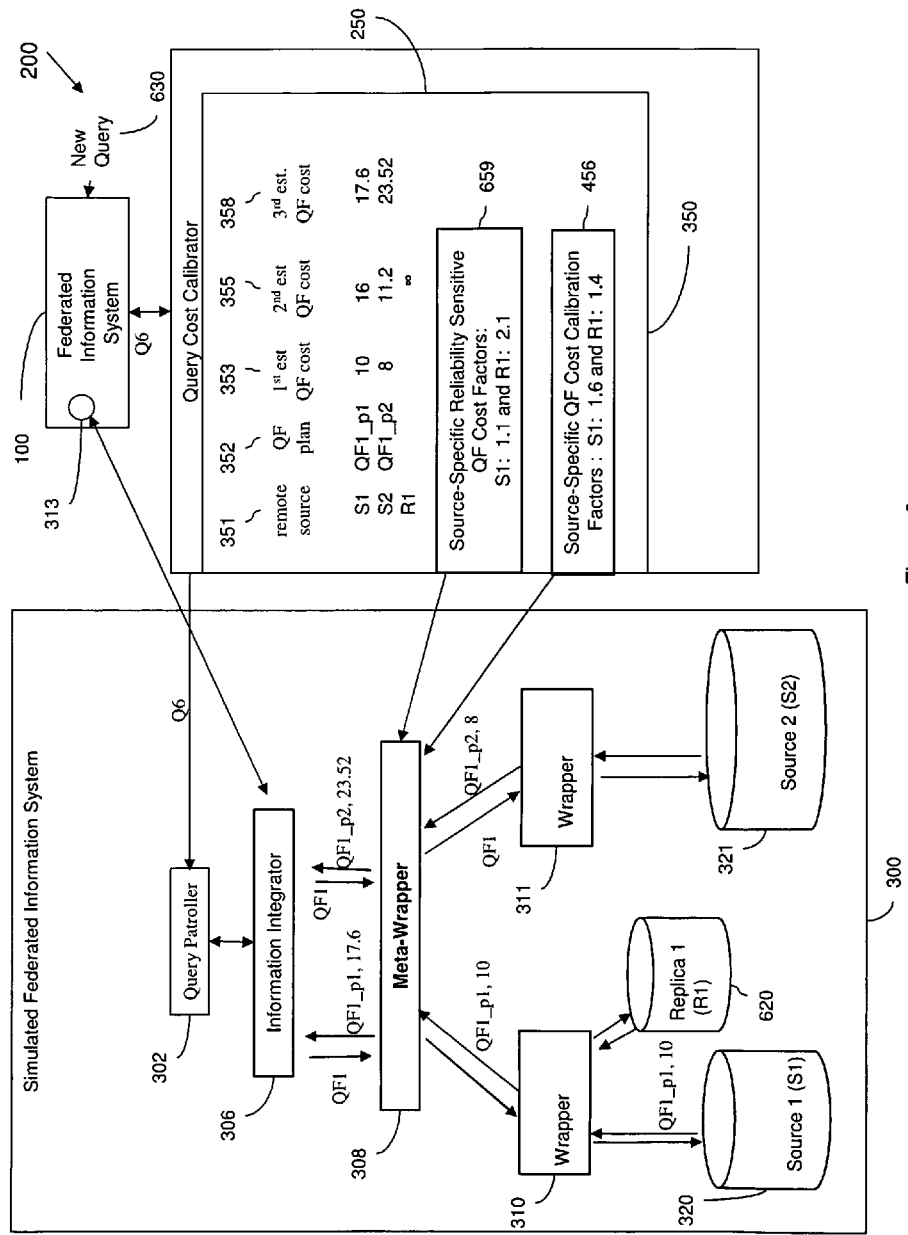
FIG. 6 is a schematic block diagram illustrating another exemplary operational process for the system of FIG. 2.

Referring to FIG. 6, additional query fragment cost estimates can also be calculated by the calibrator 250 based on data source availability and reliability. For example, the system 200 may comprise agents 313 (e.g., daemon programs). In addition to the functions described above, these agents 313 can be adapted to periodically access the federated information system 100 and determine the availability of the various data sources S1 120, S2 122 or replicas thereof (e.g., R1). Cost estimates (e.g., second cost estimates 355) of any of the data sources (e.g., R1) that are determined to be unavailable can be temporarily set in the memory 350 at infinity ($\infty$) until such time as the data source is again determined to be available. Similarly, the calibrator 250 can also be adapted to monitor and record errors occurring within the federated information system 100 that are associated with each of the data sources S1 120, S2 122 or any replicas, when those data sources/replicas are executing query fragment plans. The calibrator 250 can further be adapted to calculate for each of the data sources/replicas a percentage of query fragment processing that results in the errors. This percentage can be divided by a predetermined acceptable percentage so as to determine a reliability cost factor 659 (i.e., reliability cost calibration factors) for each of the data sources. Then, reliability-sensitive query fragment cost estimates 358 (i.e., third cost estimates) can be determined for processing each of the query fragments by multiplying the reliability cost factors 659 for each of the data sources times the second query fragment cost estimates 355 corresponding to each of the data sources. Thus, the third cost estimates 358 factor in data source reliability as well as processing latency and workload.

Referring to FIG. 7, in addition to determining source-specific cost factors and reliability cost factors, the calibrator 250 can be adapted to determine a system cost factor for each query 736 (i.e., query cost calibration factor) and this system cost factor 736 can be used by the simulator 300 to re-estimate the cost of each of the query plans based on system workload. As mentioned above, the simulator 300 can determine a first query cost estimate (i.e., a total cost estimate for processing a query based on first query fragment cost estimates and additional costs associated with merging query fragments). The calibrator 250 can then calibrate, using a weighted average, the system cost factor 736 based on at least one of processing latency and workload associated with said federated information system 100 (e.g., within the information integrator of the federated information system). Specifically, the calibrator 250 can record and store in memory 350 the actual query costs 733 of different queries 731 previously processed by the federated information system 100. Then, the calibrator 250 can divide a sum of actual query costs 733 associated with processing a plurality of different queries 731 by a sum of corresponding first query cost estimates 732 to determine the query cost calibration factor 736. For example, as illustrated in FIG. 6, the system cost factor 736 can be determined using actual query costs 733 (e.g., 18+20) and first Q cost estimates 732 (e.g., 15+15) for queries Q1 and Q2 so that the system cost factor 736 is equal to 1.26. Once the system cost factor 736 is established, the simulator 300 can determine the second query cost estimates 734 for other query plans 731 by multiplying each of the first query cost estimates 732 times the system cost factor 736 (e.g., see second query cost estimates for queries Q3 and Q4).

Figure 8:
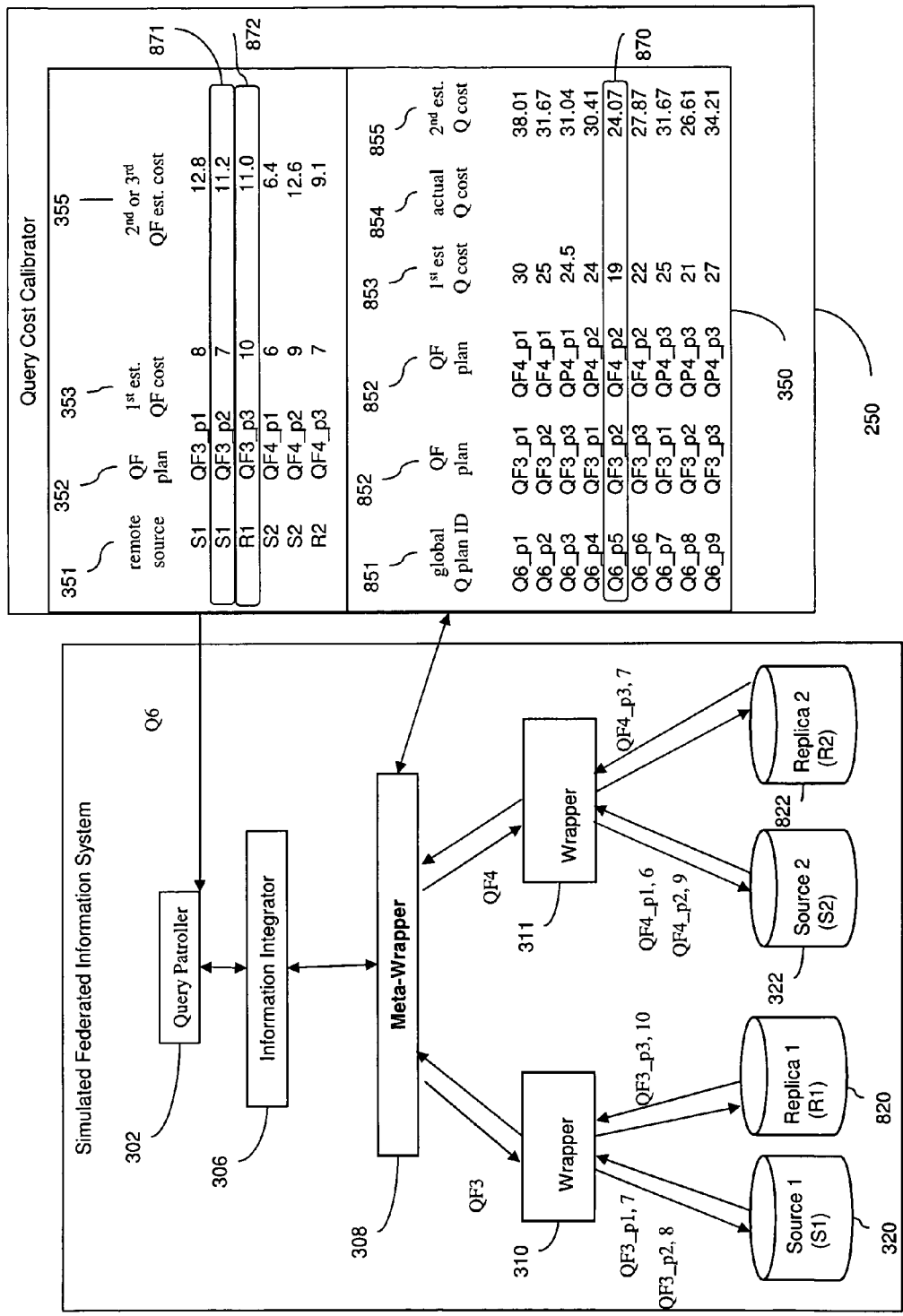
FIG. 8 is a schematic block diagram illustrating another exemplary operational process for the system of FIG. 2.
Figure 9:
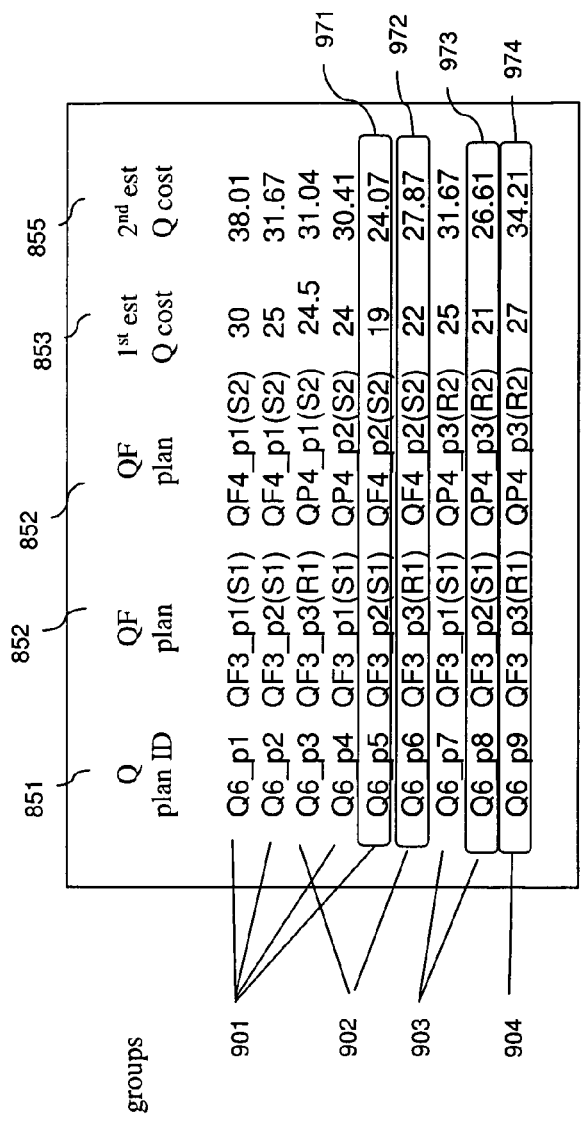
FIG. 9 is a schematic block diagram illustrating another exemplary operational process for the system of FIG. 2.
Figure 10:
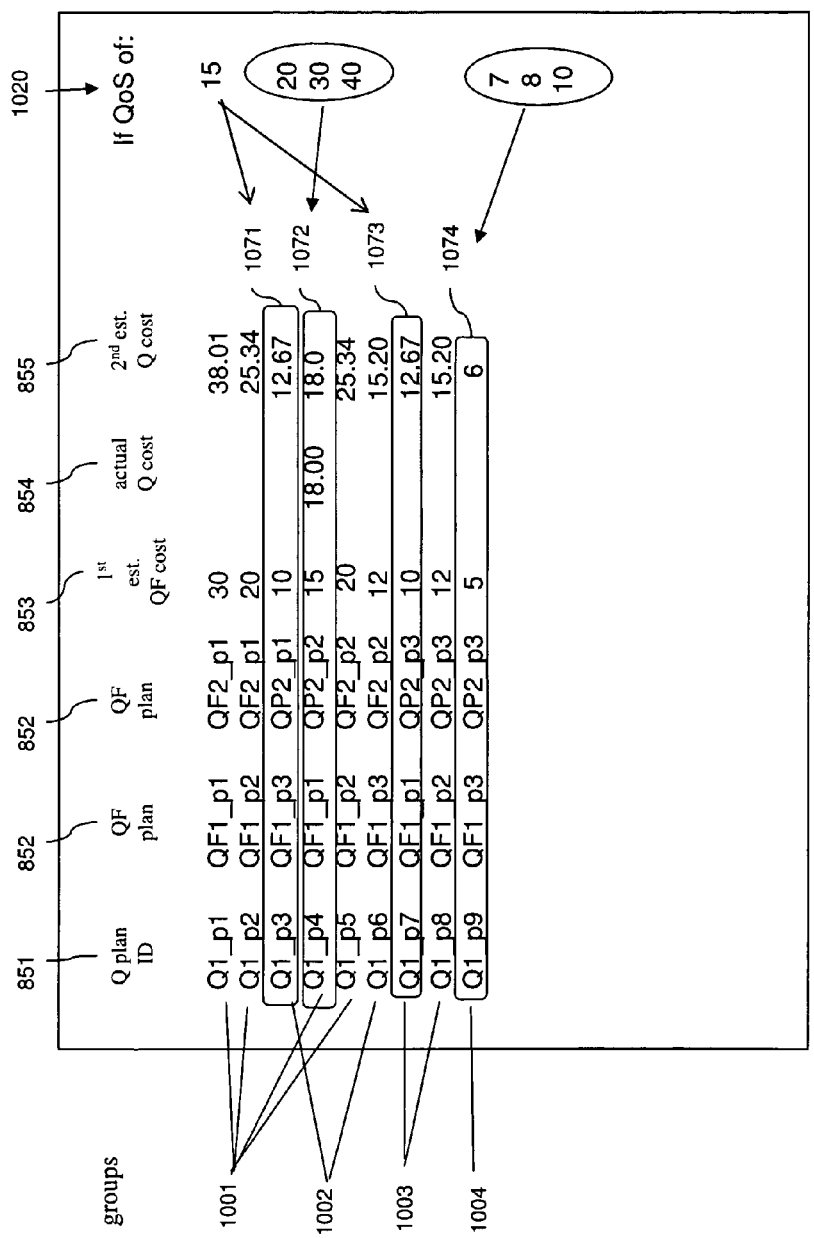
FIG. 10 is a schematic block diagram illustrating another exemplary operational process for the system of FIG. 2.

Referring to FIGS. 8-10, once the above described query and query fragment cost estimates are determined, the simulator can be used to balance workload distribution within the actual federated information system 100 either on a query plan-level or query fragment plan-level by influencing query plan selection within the federated information system. Thus, the introduction of the query cost calibrator 250 and the simulator 300 into the federated information system 100 allows for adaptive query routing based on current runtime environment instead of fixed query routing plans that are pre-determined when the mapping between nicknames and remote sources and network latency values are defined.

For example, as illustrated in FIG. 8, the simulator 250 can be adapted to balance load distribution on a query fragment plan-level by first determining which of the query plans 851 has the lowest second query cost estimate 853 (i.e., a query cost estimate based on system workload) or, optionally, the lowest first query cost estimate 855 (e.g., see plan 870 which has both the lowest first query cost estimate 855 and second query cost estimate 855) and analyzing that plan 870. For example, the simulator 250 can determine the workloads associated with each of the query fragment plans 852 within that query plan 870 and compare those workloads to predetermined thresholds. The workload for a specific query fragment plan 852 can be determined by multiplying a query fragment cost estimate, such as either a second query cost estimate 355 (based on data source workload and latency) or third cost estimate (based on data source workload, latency, and reliability) times the frequency at which the query (e.g., query Q6) is requested in a given period. If the calibrator 250 determines that the workload associated with the specific query fragment plan (e.g., query fragment plan QF3_p2 871) is above the predetermined threshold, the simulator 300 can balance workload distribution for that query fragment. This can be accomplished by identifying at least one other query fragment plan (e.g., query fragment plan QF3_p3 872) that is both identical to the specific query fragment plan (e.g., the same query fragment plan but located on a replica R1 (820) of or source S1 (320)) and has a second or third query fragment cost estimate 355 (or optionally, a first query fragment cost estimate) close to the specific query fragment plan (e.g., within twenty percent). Then, each time the query (e.g., query Q6) is requested, the simulator 300 can submit the one query plan 870 to the federated information system. However, each time this one query plan 870 is submitted, the specific query fragment plan (e.g., QF3_p2 871) and the other identical query fragment plan (e.g., QF3_p3 872) are interchanged in an alternating manner (e.g., in a rotating manner) so as to distribute the query fragment workload across different data sources 120-122 within the federated information system 100.

Referring to FIG. 9, the simulator 300 can also be adapted to balance load distribution on a query plan-level. This is accomplished by determining which of the query plans 851 has the lowest second query cost estimate (i.e., the lowest cost estimate based on system workload) (or, optionally, the lowest first query cost estimate 853) and analyzing that query plan (see item 971 referencing a plan with both the lowest first query cost estimate 853 and second query cost estimate 855). If that cost estimate is above a predetermined threshold value, the simulator 300 can instead of selecting just the lowest plan, select a plurality of query plans from amongst the alternative plans 851 to be submitted to the federated information system in an alternating manner. The number of query plans selected can be limited in a cost-efficient manner by first clustering the query plans into groups 901-904 such that each query plan 851 in a given group 901-904 has query fragment plans 852 associated with the same set of data sources (e.g., S1 and S2, R1 and S2, S1 and R2, etc.) and then selecting only those query plans 971-974 having the lowest second query cost estimates 855 (or, optionally, having the lowest first query cost estimates 853) from each of the groups 901-904. The number of query plans can be further limited by determining which one of those selected query plans 971-974 has the lowest cost estimate 971 and which of the other query plans having second query cost estimates that are near that lowest cost estimate (e.g., those query plans 972 and 973 having a second query cost estimate 855 within twenty percent of the lowest second query cost estimate of plan 971). Then, each time the query (e.g., query Q6) is requested, the simulator 300 can submit to the federated information system 100 any one of the selected plurality of query plans 971-973 in an alternating manner (e.g., in a rotating manner) so as to distribute the query workload across different data sources within the federated information system 100.

Referring to FIG. 10, balancing of load distribution can be alternatively accomplished by the simulator 300 at the query plan-level based on quality of service (QoS) constraints. For example, the simulator 300 can again cluster the query plans 851 into groups 1001-1004 with each group 1001-1004 having query fragment plans 852 that are associated with the same set of data sources, as described above. For each group 1001-1004, the query plan with the lowest second query cost estimate 855 (or, optionally, the query plan with the lowest first query cost estimate 853) is selected for consideration (e.g., plans 1071-1074). If each time a query (e.g., Q1) is requested it is submitted with a QoS constraint 1020 for cost, then each time the query is requested, one query plan is selected from amongst the remaining low cost plans 1071-1074 based on that QoS constraint 1020. The one plan that is selected is that query plan that has a second query cost estimate 855 (or, optionally, a first query cost estimate 853) that is closest to without being greater than the predetermined cost requirement 1020 (i.e., a quality of service constraint for cost). For example, for a QoS constraint of 15, either query plan 1071 or 1073, each with second query cost estimates 855 of 12.67 may be selected. Similarly, for any QoS constraint above 20 or above, query plan 1072 with a second query fragment cost estimate 855 of 18 may be selected.

Embodiments of the system 200 can take the form of an entirely hardware embodiment, an entirely software embodiment or an embodiment including both hardware and software elements. In a preferred embodiment, the invention is implemented using software, which includes but is not limited to firmware, resident software, microcode, etc. Furthermore, embodiments of the system 200 can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Therefore, disclosed are embodiments of a system for optimizing query processing in a federated information system. The system may be used to identify alternative query plans in a simulated environment and to calculate cost estimates associated with the alternative query plans, based not only on database statistics and query statements but also based on workload and processing latencies associated with specific data source and with the federated information system as a whole. In addition the calculated cost estimates may also factor in data source availability and reliability. The system may use the alternative query plans and the associated cost estimates to influence query processing in a federated information system by feeding to the federated information system query plans that allow for cost-efficient query plan-level load distribution, cost-efficient query fragment plan-level load distribution, and load distribution based upon quality of service cost requirements. The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that the invention can be practiced with modification within the spirit and scope of the appended claims.

What is claimed is:

1. A system for optimizing query processing in a federated information system, said system comprising:
   a processor;
   memory elements comprising a computer readable medium operatively connected to said processor;
   a calibrator, operating through said processor and memory elements, in communication with said federated information system and adapted to intercept queries to said federated information system;
   a simulator, operating through said processor and memory elements, in communication with said calibrator and adapted to derive alternative query plans for each of said queries, wherein each of said query plans comprises a plurality of query fragment plans associated with at least one data source, wherein said simulator is further adapted to determine first query fragment cost estimates for each of said query fragment plans, wherein said calibrator is further adapted to calibrate source-specific cost factors for each data source in said federated information system based on workload associated with said corresponding data source, and wherein said simulator is further adapted to calculate second query fragment cost estimates by multiplying each of said first query fragment cost estimates times a corresponding one of said source-specific cost factors.

2. The system of claim 1, further comprising agents, operating through said processor and memory elements, adapted to issue an initial query fragment to said specific data source so that said actual query fragment cost for processing said initial query fragment can be recorded and so that said first query fragment cost estimate and said actual query fragment cost can be processed by said calibrator to determine said source-specific cost factor.

3. The system of claim 1, wherein said simulator is further adapted to determine first query cost estimates for each of said query plans.

4. The system of claim 3, wherein said calibrator is further adapted to calibrate a system cost factor based on at least one of processing latency and workload associated with said federated information system, and wherein said simulator is further adapted to calculate second query cost estimates for each of said query plans by multiplying each of said first query cost estimates times said system cost factor.

5. The system of claim 1, wherein said calibrator is further adapted to calibrate said system cost factor by dividing a sum of actual query costs associated with processing a plurality of different queries in said federated information system by a sum of corresponding first query cost estimates.

6. The system of claim 1, wherein said simulator is further adapted to select and to submit to said federated information system one of said query plans, wherein said one query plan has a lowest second query cost estimate as compared to other query plans with query fragment plans associated with the same set of data sources and wherein said one query plan also has a second total cost estimate that is closest to without being greater than a predetermined cost requirement.

7. The system of claim 1, further comprising agents, operating through said processor and memory elements, adapted to periodically access and determine availability of said data sources, wherein said simulator is further adapted to set at infinity any query fragment cost estimate corresponding to any data source that is determined to be unavailable.

8. The system of claim 7, wherein said simulator is further adapted to determine a third query fragment cost estimate for each of said query fragment plans based on reliability of each of said data sources by multiplying said reliability-sensitive query fragment cost factors for each of said data sources times said second query fragment cost estimates corresponding to each of said data sources.

9. The system of claim 1, wherein said calibrator is adapted to:
monitor and record errors associated with each of said data sources when executing said query fragments,
calculate for each of said data sources a percentage of query fragment processing that results in said errors,
divide said percentage by a predetermined acceptable percentage so as to determine reliability-sensitive query fragment cost factors for each of said data sources.

10. A system for optimizing query processing in a federated information system, said system comprising:
a processor;
memory elements comprising a computer readable medium operatively connected to said processor;
a calibrator, operating through said processor and memory elements, in communication with said federated information system and adapted to intercept queries to said federated information system; and
a simulator, operating through said processor and memory elements, in communication with said calibrator and adapted to derive alternative query plans for each of said queries and to determine a first query cost estimate for each of said query plans, wherein said calibrator is adapted to calibrate a system cost factor for said federated information system based on workload associated with said federated information system, and wherein said simulator is further adapted to calculate second query cost estimates for each of said query plans by multiplying each of said first query cost estimate times said system cost factor and to balance workload distribution by select a plurality of query plans based on said second query cost estimates, and each time said query is requested, submitting any one of said plurality of query plans to said federated information system.

11. The system of claim 10, wherein said simulator is adapted to limit said plurality of query plans by clustering query plans in groups such that each query plan in a given group has query fragments associated with the same set of sources and by selecting the query plans having the lowest second query cost estimates from each of said groups.

12. The system of claim 11, wherein said simulator only balances workload distribution if a query plan with said lowest second query cost estimate is above a predetermined threshold value.

13. The system of claim 10, wherein said simulator is adapted to further limit said plurality of plans by selecting one query plan having the lowest second query cost estimate from amongst said selected query plans having said lowest second query cost estimates from each group and by selecting those query plans having second query cost estimates that are near said lowest second query cost estimate.

14. A system for optimizing query processing in a federated information system, said system comprising:
a processor;
memory elements comprising a computer readable medium operatively connected to said processor;
a calibrator, operating through said processor and memory elements, in communication with said federated information system and adapted to intercept queries to said federated information system; and
a simulator, operating through said processor and memory elements, in communication with said calibrator and adapted to derive alternative query plans for each of said queries and to determine first query fragment cost estimates for each query fragment plan within each of said query plans;

wherein said calibrator is further adapted to calibrate source-specific cost factors for each data source associated with each of said query fragment plans based on workload, wherein said simulator is further adapted to calculate second query fragment cost estimates for each of said query fragment plans by multiplying each of said first query fragment cost estimates times a corresponding one of said source-specific cost factors, and wherein said simulator is further adapted to balance workload distribution by selecting one of said query plans for submission to said federated information system each time said query is requested and each time said one query plan is submitted to said federated information system interchanging at least one query fragment plan within said one query plan with other identical query fragment plans based on said second query fragment costs.

15. The system of claim 14, wherein said simulator is further adapted to determine first query cost estimates for each of said query plans.

16. The system of claim 15, wherein said calibrator is further adapted to calibrate a system cost factor based on at least one of processing latency and workload associated with said federated information system.

17. The system of claim 16, wherein said calibrator is further adapted to calculate second query cost estimates for each of said query plans by multiplying said first query cost estimate times said system cost factor.

18. The system of claim 17, wherein said simulator is adapted to select as said one query plan a query plan with the lowest second query cost estimate.

19. The system of claim 17, wherein said simulator only balances workload distribution if a workload of said query fragment plan is determined to be above a predetermined threshold.

20. The system of claim 19, further comprising an agent, operating through said processor and memory elements, adapted to issue an initial query fragment to said specific data source so that said actual query fragment cost for processing said initial query fragment can be recorded and so that said first query fragment cost estimate and said actual query fragment cost can be processed by said calibrator to determine said source-specific cost factor.

* * * * *